(12) United States Patent
Tanida et al.

(10) Patent No.: US 12,025,536 B2
(45) Date of Patent: Jul. 2, 2024

(54) LEAKAGE DETECTOR

(71) Applicant: AISAN KOGYO KABUSHIKI KAISHA, Obu (JP)

(72) Inventors: Yuya Tanida, Obu (JP); Mariko Kawase, Funabashi (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 224 days.

(21) Appl. No.: 17/730,489

(22) Filed: Apr. 27, 2022

(65) Prior Publication Data

US 2022/0349772 A1 Nov. 3, 2022

(30) Foreign Application Priority Data

Apr. 30, 2021 (JP) ................................. 2021-077341

(51) Int. Cl.
*G01M 3/28* (2006.01)
*G01F 23/30* (2006.01)
(52) U.S. Cl.
CPC ............... *G01M 3/28* (2013.01); *G01F 23/30* (2013.01)
(58) Field of Classification Search
CPC ................................. G01M 3/28; G01F 23/30
See application file for complete search history.

(56) References Cited

U.S. PATENT DOCUMENTS

| | | | |
|---|---|---|---|
| 8,683,852 B2 | 4/2014 | Makino | |
| 9,322,366 B2* | 4/2016 | Pursifull | ............... G01M 15/09 |
| 9,932,944 B2* | 4/2018 | Yang | ..................... G01L 5/0052 |
| 11,322,759 B2* | 5/2022 | Kwon | ............... H01M 8/04798 |
| 11,326,559 B2* | 5/2022 | Nakagawa | .......... F02M 25/0836 |
| 11,649,789 B2* | 5/2023 | Lee | .................. F02M 35/10222 |
| | | | 123/518 |
| 11,703,434 B2* | 7/2023 | Tanida | ...................... G01N 7/04 |
| | | | 73/19.05 |
| 11,732,679 B2* | 8/2023 | Kawase | ............. F02M 25/0818 |
| | | | 73/32 R |
| 2001/0027682 A1* | 10/2001 | Takagi | ............... F02M 25/0818 |
| | | | 73/114.39 |
| 2011/0186020 A1* | 8/2011 | Makino | .................. F02M 33/02 |
| | | | 123/521 |
| 2011/0214646 A1* | 9/2011 | Makino | .................. B01D 50/00 |
| | | | 96/108 |

FOREIGN PATENT DOCUMENTS

JP 4239716 B2 * 3/2009
JP 5318793 B2 10/2013

* cited by examiner

*Primary Examiner* — John Fitzgerald
(74) *Attorney, Agent, or Firm* — CONLEY ROSE, P.C.

(57) ABSTRACT

A leakage detector for a fuel vapor processing system includes a pressure sensor and a control unit. The pressure sensor is configured to measure an internal pressure of the fuel vapor processing system. The control unit is configured to calculate changes of a fuel vapor pressure from a saturation vapor pressure curve of the fuel vapor, a fuel vapor concentration of the fuel vapor in a gaseous layer within the fuel vapor processing system, and a convective velocity in the gaseous layer, to correct a reference pressure for leakage detection based on the changes of the fuel vapor pressure so as to calculate a corrected reference pressure, and to compare the internal pressure measured by the first pressure sensor to the corrected reference pressure so as to determine whether any of the fuel vapor has leaked from the fuel vapor processing system.

5 Claims, 7 Drawing Sheets

LEAKAGE DETECTOR

CROSS-REFERENCE TO RELATED APPLICATIONS

This application claims priority to Japanese patent application serial number 2021-077341, filed Apr. 30, 2021, which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to leakage detectors.

One type of leakage detector is provided for a fuel vapor processing system for a vehicle equipped with an engine driven by a liquid fuel, such as gasoline. The leakage detector is configured to detect vapor leakage based on pressure changes in the fuel vapor processing system. Specifically, such leakage diagnosis is performed based on whether the internal pressure decreases below a predetermined reference pressure when a negative pressure is applied to the fuel vapor processing system that is in a sealed state.

SUMMARY

In one aspect of this disclosure, a leakage detector for a fuel vapor processing system, which is configured to prevent fuel vapor evaporated in a fuel tank from flowing to an outside, includes a first pressure sensor configured to measure an internal pressure of the fuel vapor processing system, and a control unit implemented by at least one programmed processor. The control unit is configured to calculate changes of a fuel vapor pressure from a saturation vapor pressure curve of the fuel vapor, a fuel vapor concentration of the fuel vapor in a gaseous layer within the fuel vapor processing system, and a convective velocity in the gaseous layer. The control unit is configured to correct a reference pressure for leakage detection based on the changes of the fuel vapor pressure so as to calculate a corrected reference pressure. The control unit is configured to compare the internal pressure measured by the first pressure sensor to the corrected reference pressure so as to determine whether any of the fuel vapor has leaked from the fuel vapor processing system.

DETAILED DESCRIPTION

As described above, the leakage detector for the fuel vapor processing system is configured to detect vapor leakage by comparing a vapor pressure in the fuel vapor processing system to a reference pressure. Further, Japanese Laid-Open Patent Publication No. 2011-157915 discloses a leakage detector configured to correct the reference pressure based on the temperature of the fuel vapor processing system, since an internal vapor pressure changes depending on the temperature of the fuel vapor processing system during application of the negative pressure. However, such a leakage detector does not take into consideration that the vapor pressure could also change due to the concentration of the fuel vapor and the convective velocity of the gaseous layer within a fuel tank, which are factors other than the temperature. Therefore, there has been a need for improved leakage detectors.

An embodiment of this disclosure will be described based on FIGS. 1-13. In following descriptions, orientations, such as upper, lower, right, and left, correspond to directions illustrated in each drawing.

A fuel vapor processing system 1 according to a first embodiment is configured such that fuel vapor evaporated in a fuel tank 20 of a vehicle is introduced into an engine 10, so as to prevent the fuel vapor from flowing to the outside. The fuel vapor processing system 1 is equipped with a leakage detector, a concentration measuring device, and a convective velocity measuring device.

Figure 1:
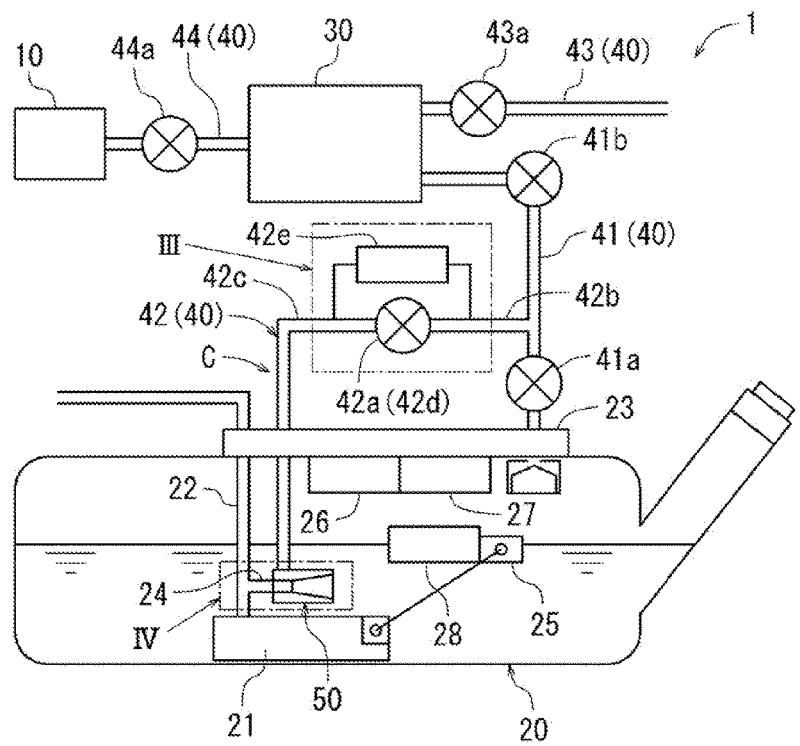
FIG. 1 is a schematic view of an embodiment of a fuel vapor processing system, which includes a leakage detector according to the principles described herein.
Figure 2:
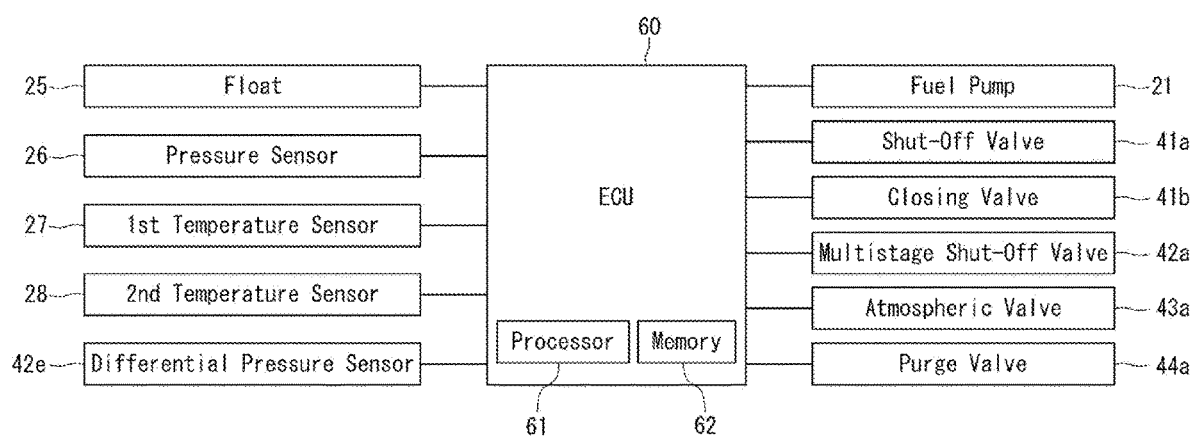
FIG. 2 is a schematic view of an embodiment of an electronic control unit incorporated in the fuel vapor processing system of FIG. 1.

As shown in FIG. 1, the fuel vapor processing system 1 includes the engine 10, the fuel tank 20, a canister 30, and vapor piping 40. The engine 10 runs on liquid fuel, such as gasoline. The fuel tank 20 stores the liquid fuel therein. The canister 30 is in fluid communication with the fuel tank 20 and is capable of adsorbing and desorbing fuel vapor evaporated in the fuel tank 20. The vapor piping 40 connects the engine 10, the fuel tank 20, and the canister 30 to each other and is configured to flow the fuel vapor therethrough. As shown in FIG. 2, the fuel vapor processing system 1 includes an electronic control unit (ECU) 60 configured to control the engine 10, among other components. The ECU 60 may be implemented by at least one programmed processor whose operation is determined by a predetermined program, gate arrays, and/or the like. As shown in FIG. 1, an interior space of the fuel tank 20 is divided into a liquid layer composed of the liquid fuel and a gaseous layer composed of the fuel vapor and air.

The canister 30 houses an adsorbent, such as activated carbon, therein. The adsorbent is configured to trap and adsorb the fuel vapor and not to adsorb air. That is, air can freely pass through the canister 30 filled with the adsorbent. As shown in FIG. 1, the canister 30 is in fluid communication with each of the fuel tank 20, the engine 10, and the atmosphere. More specifically, the canister 30 is in fluid communication with the gaseous layer of the fuel tank 20 via a vapor passage 41, a shut-off valve 41*a*, and a closing valve 41*b*. The canister 30 is in fluid communication with the engine 10 via a purge passage 44 and a purge valve 44*a*. The canister 30 is in fluid communication with the atmosphere via an atmospheric passage 43 and an atmospheric valve 43*a*.

In accordance with the above-described configuration, when the internal pressure of the fuel tank 20 becomes higher than atmospheric pressure in a state where the shut-off valve 41*a*, the closing valve 41*b*, and the atmospheric valve 43 are open, a gaseous mixture which includes air and fuel vapor flows from the gaseous layer of the fuel tank 20 into the canister 30 via the vapor passage 41. When the gaseous mixture flows into the canister 30, the fuel vapor contained in the gaseous mixture is trapped and adsorbed on the adsorbent. On the other hand, the air contained in the gaseous mixture flows through the canister 30 and is released into the atmosphere via the atmospheric passage 43. In this way, the canister 30 is configured to prevent the fuel vapor from flowing to the outside while also depressurizing the fuel tank 20. When the engine 10 is running and the purge valve 44*a* is open, the intake negative pressure generated by the engine 10 is applied to the canister 30. In such condition, the fuel vapor trapped and adsorbed in the canister 30 is desorbed from the adsorbent and is introduced into the engine 10 via the purge passage 44.

The fuel tank 20 includes a set plate 23 that is removably attached to an upper surface of the fuel tank 20.

As shown in FIG. 1, the fuel tank 20 includes a fuel pump 21 and a supply pipe 22. The fuel pump 21 is located in the fuel tank 20 and is positioned on a bottom of the fuel tank 20. The supply pipe 22 extends from the fuel pump 21 through the set plate 23 to the engine 10. The fuel pump 21 is configured to pump the liquid fuel from the fuel tank 20 to the engine 10 via the supply pipe 22. The fuel tank 20 includes a branch passage 24 and an aspirator 50. The branch passage 24 branches from the supply pipe 22 in the liquid layer. The aspirator 50 is attached to a free end of the branch passage 24. Thus, when the fuel pump 21 pumps the liquid fuel toward the engine 10, a part of the liquid fuel flows through the branch passage 24 and then is jetted from the aspirator 50 toward the liquid layer. Due to this jet, the aspirator 50 generates negative pressure therein by the Venturi effect.

The fuel tank 20 includes a level sensor for detecting a remaining amount of the liquid fuel in the fuel tank 20. The level sensor includes a rotatable arm, and a float 25 that is attached to a free end of the arm and is configured to float on the surface of the liquid fuel. The level sensor is configured to measure the remaining amount of the liquid fuel based on an angle of the arm. The fuel tank 20 includes a pressure sensor 26 disposed in the gaseous layer. The pressure sensor 26 is configured to measure the pressure of the gaseous layer within the fuel tank 20. The fuel tank 20 includes a first temperature sensor 27 and a second temperature sensor 28. The first temperature sensor 27 is disposed on a lower surface of the set plate 23. The second temperature sensor 28 is attached to the float 25. The first temperature sensor 27 is configured to measure temperature at an upper region of the gaseous layer of the fuel tank 20. The second temperature sensor 28 is configured to measure temperature at a lower region of the gaseous layer of the fuel tank 20.

As shown in FIG. 1, the vapor piping 40 includes a suction passage 42 branching from the vapor passage 41, in addition to the vapor passage 41, the atmospheric passage 43, and the purge passage 44. The suction passage 42 branches from a portion of the vapor passage 41 on the fuel tank 20 side of the closing valve 41*b*. In other words, the suction passage 42 branches from a portion of the vapor passage 41 between the shut-off valve 41*a* and the closing valve 41*b*. The suction passage 42 extends into the fuel tank 20 and is connected to the aspirator 50. Due to this configuration, the vapor passage 41 and the suction passage 42 form a circulation passage C that is configured to circulate the gaseous mixture of the gaseous layer of the fuel tank 20 between the inside and the outside of the fuel tank 20.

Figure 3:
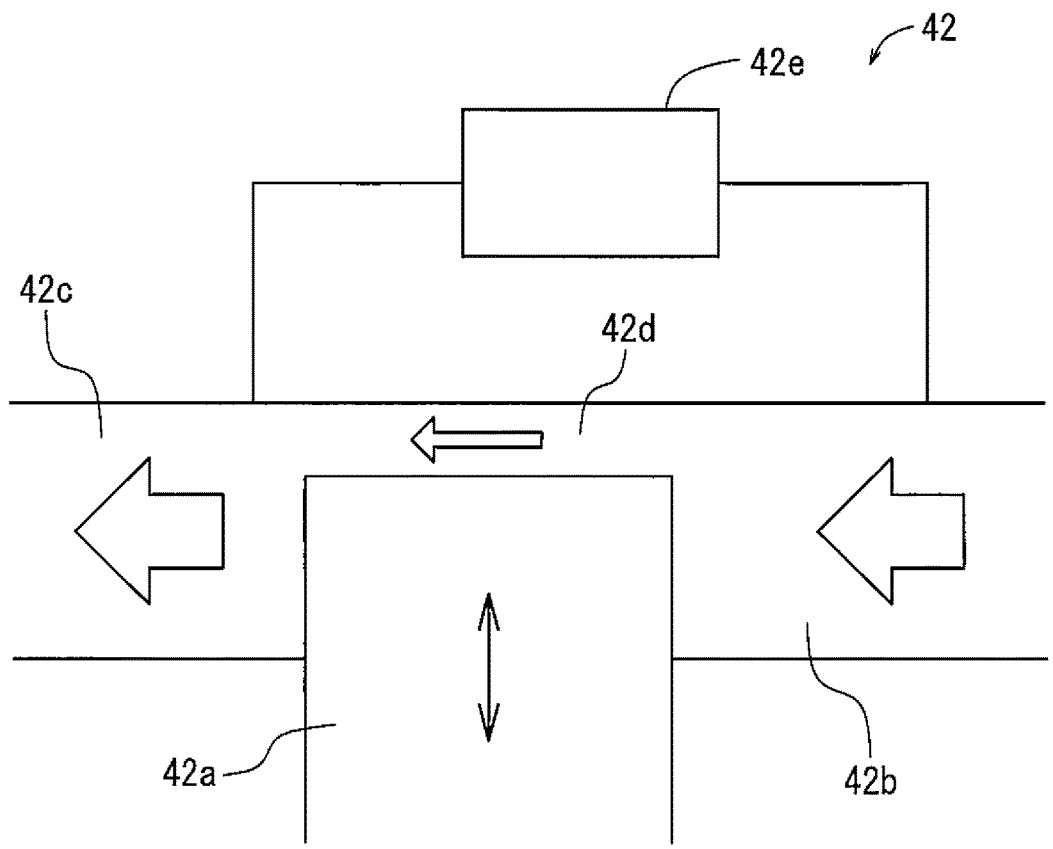
FIG. 3 is an enlarged view of a section III of FIG. 1.

A multistage shut-off valve 42*a* is provided in a middle portion of the suction passage 42 to form a narrowed part 42*d*. The narrowed part 42*d* of the suction passage 42 has a narrowed passage width, which may be narrower than the passage width of the suction passage 42. The multistage shut-off valve 42*a* is connected to a stepping motor or the like, and is configured to change an opening amount of the multistage shut-off valve 42*a*. As shown in FIG. 3, the passage width of the suction passage 42 is varied depending on the opening amount of the multistage shut-off valve 42*a*. The suction passage 42 includes an upstream suction passage 42*b* and a downstream suction passage 42*c*, such that the upstream suction passage 42*b* is connected to the downstream suction passage 42*c* via the narrowed part 42*d*. The suction passage 42 is provided with a differential pressure sensor 42*e* configured to measure a pressure difference of the gaseous mixture before and after having passed through the narrowed part 42*d*.

The suction passage 42 is in fluid communication with the aspirator 50, so that the negative pressure generated in the aspirator 50 is applied to the suction passage 42. Thus, when the negative pressure is applied under a state where the shut-off valve 41*a* and the multistage shut-off valve 42*a* are open and where the closing valve 41*b* is closed, the gaseous mixture flows from the gaseous layer of the fuel tank 20, through the vapor passage 41 and the suction passage 42, and then returns to the gaseous layer. Further, the internal pressure of the downstream suction passage 42*c* can be decreased to be made negative when the aspirator 50 generates the negative pressure under a state where the multistage shut-off valve 42*a* is closed.

Figure 4:
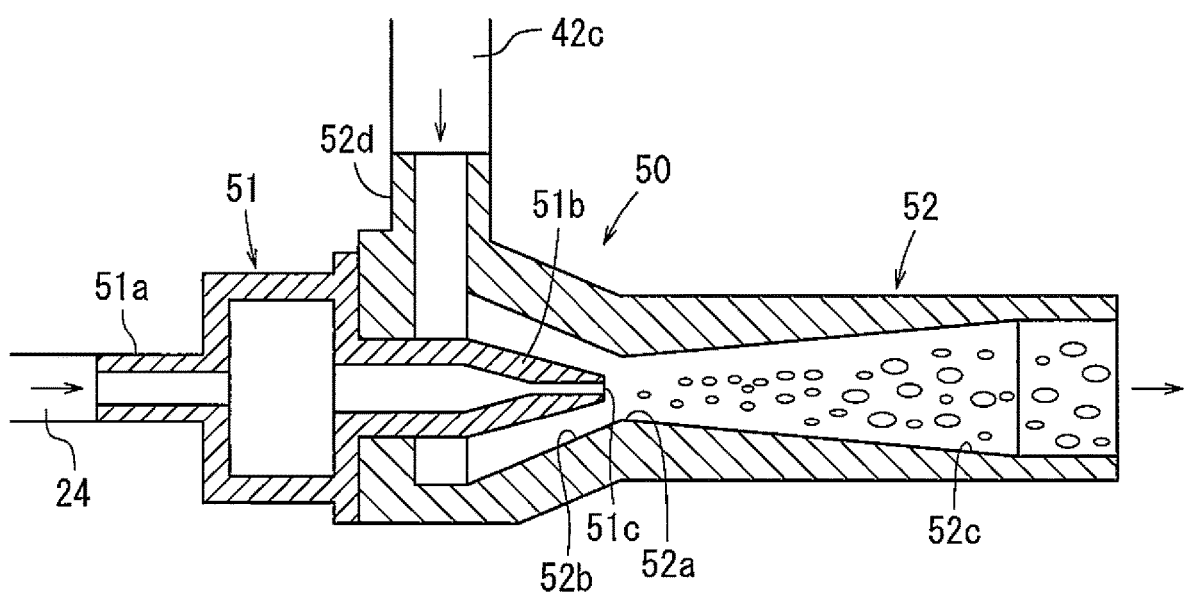
FIG. 4 is an enlarged view of a section IV of FIG. 1.

As shown in FIG. 4, the aspirator 50 includes a nozzle part 51 configured to jet the liquid fuel. The aspirator 50 also includes a venturi part 52 configured to generate a negative pressure due to the liquid fuel jet from the nozzle part 51. The nozzle part 51 includes an inflow port 51*a* and a nozzle body 51*b*. The inflow port 51*a* is connected to the branch passage 24, such that the liquid fuel flows from the branch passage 24 and into the nozzle part 51 via the inflow port 51*a*. The nozzle body 51*b* has a jet port 51*c* at one end thereof and is configured to jet the fuel from the jet port 51*c* toward the venturi part 52. The venturi part 52 substantially has a cylindrical shape and includes a constricted section 52*a*, a decompression chamber 52*b*, and a diffuser 52*c* therein, all of which are coaxially aligned. The inner diameter of the decompression chamber 52*b* gradually decreases in a discharge direction of the liquid fuel from the nozzle body 51*b*. The inner diameter of the diffuser 52*c* gradually increases in the discharge direction of the liquid fuel. The constricted section 52*a* is positioned between the decompression chamber 52b and the diffuser 52c, such that the inner diameter of the venturi part 52 is the smallest at the constricted section 52a. The venturi part 52 includes a suction port 52d, such that the decompression chamber 52b is in fluid communication with the downstream suction passage 42c via the suction port 52d.

As shown in FIG. 4, the nozzle part 51 is coaxially attached to the venturi part 52. Thus, the nozzle body 51b of the nozzle part 51 is inserted into the venturi part 52 from the decompression chamber 52b side of the venture part 52, such that the jet port 51c is positioned close to and in front (in the direction of fluid flow) of the constricted section 52a. Due to this configuration, the fuel discharged from the jet port 51c flows through the constricted section 52a and the diffuser 52c at high speed in an axial direction of these parts. As a result, a negative pressure is generated in the decompression chamber 52b by the Venturi effect.

As shown in FIG. 2, the ECU 60 includes a processor 61 and a memory unit 62. The memory unit 62 may be formed of any suitable component, including a read-only memory, a random-access memory, or the like. The ECU 60 is configured to perform the leakage diagnosis with the processor 61 by operating programs stored in the memory unit 62. The ECU 60 receives measurement signals from the float 25, the pressure sensor 26, the first temperature sensor 27, the second temperature sensor 28, and the differential pressure sensor 42e. Further, the ECU 60 transmits control signals to the fuel pump 21, the shut-off valve 41a, the closing valve 41b, the multistage shut-off valve 42a, the atmospheric valve 43a, and the purge valve 44a, so as to control them.

A method for detecting vapor leakage from the fuel tank 20 will be described based on the fuel vapor processing system 1. In brief, after closing the shut-off valve 41a, the closing valve 41b, and the multistage shut-off valve 42a in a state where the internal pressure of the fuel tank 20 is positive, temporal changes of the internal pressure of the fuel tank 20 are measured by the pressure sensor 26. When the internal pressure of the fuel tank 20 is less than a reference pressure after a predetermined period of time has elapsed from when the valves 41a, 41b, 42a were closed, it is determined that leakage from the fuel tank 20 occurs. The reference pressure corresponds to a diagnostic criteria previously calculated by or stored in the ECU 60.

Figure 5:
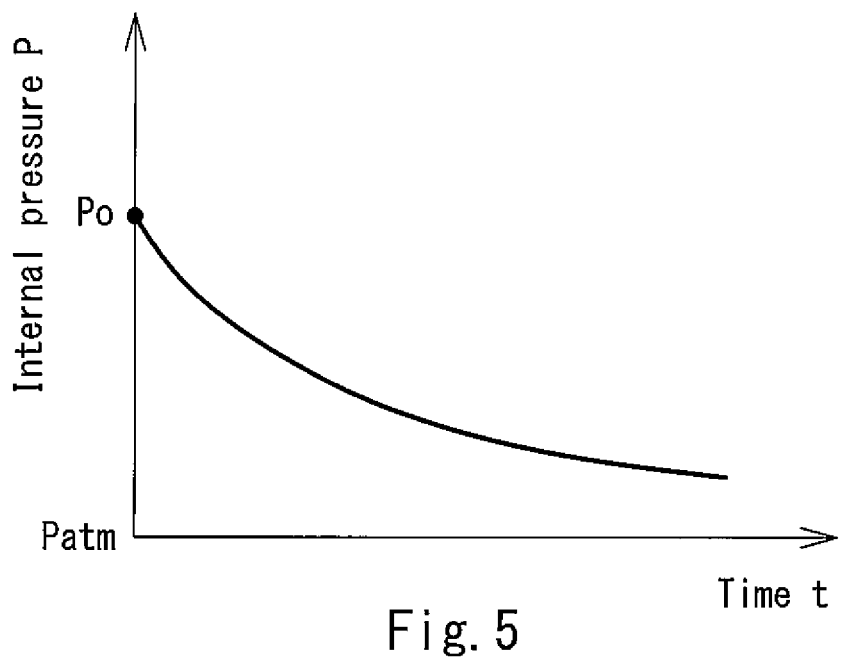
FIG. 5 is a graph showing temporal changes of a non-corrected reference pressure.

The detection method of the vapor leakage will be described in more detail. First, the ECU 60 calculates the reference pressure, which may correspond to a virtual temporal change of the internal pressure of the fuel tank 20. In this embodiment, the virtual temporal change is calculated based on Bernoulli's theorem, or the like, which may be further based on the assumption that an initial internal pressure P0 of the closed fuel tank 20 is higher than atmospheric pressure Patm, and that the fuel tank 20 has a circular opening, having an inner diameter of 0.5 mm, in fluid communication with the outside. An example of the calculated reference pressure is shown in FIG. 5. However, in some embodiments, the initial pressure P0 may be less than atmospheric pressure Patm. In such case, when the internal pressure of the fuel tank 20 is higher than the calculated reference pressure after a predetermined period of time has elapsed from when the valves 41a, 41b, 42a were closed, it is determined that leakage from the fuel tank 20 has occurred.

The internal pressure of the fuel tank 20 is influenced by changes in the fuel vapor pressure in the gaseous layer of the fuel tank 20. Thus, it has been discovered that it is beneficial to estimate the temporal change of the fuel vapor pressure and then to correct the reference pressure based on the estimated temporal change of the fuel vapor pressure. Specifically, the reference pressure is corrected such that as the vapor pressure becomes higher, the reference pressure becomes higher, and such that as the vapor pressure becomes lower, the reference pressure becomes lower. It was discovered that the temporal change of the vapor pressure can be estimated based on certain characteristics, such as the saturation vapor pressure, partial pressure (or concentration) of the fuel vapor in the gaseous mixture, and convective velocity of the gaseous mixture in the gaseous layer.

Figure 6:
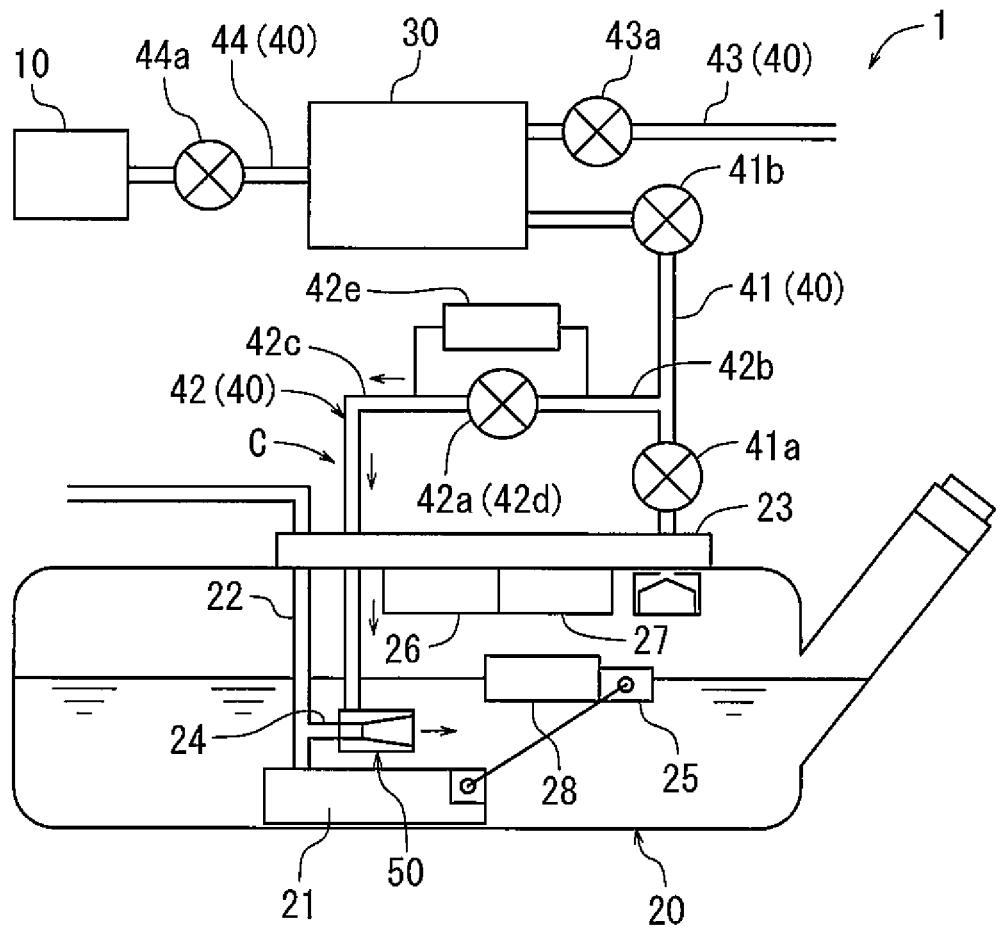
FIG. 6 is a schematic view of the fuel vapor processing system of FIG. 1 in a state where a saturation vapor pressure curve is estimated.

The characteristic of the saturation vapor pressure may be represented by a saturation vapor pressure curve. Thus, in order to estimate the temporal change, the ECU 60 is configured to specify the saturation vapor pressure curve showing a relationship between the temperature in the gaseous layer and the saturation vapor pressure of the fuel vapor. As shown in FIG. 6, the fuel pump 21 is driven to forcedly feed the liquid fuel under a state where the multistage shut-off valve 42a is closed. When the pumped liquid fuel flows through the aspirator 50, a negative pressure is generated in the decompression chamber 52b of the aspirator 50, thereby applying a negative pressure to the downstream suction passage 42c. The negative pressure causes evaporation of the liquid fuel within the decompression chamber 52b. Thus, in a state where the sucking operation of the aspirator 50 is stable, an increase in the vapor pressure caused by the evaporation of the liquid fuel partially offsets a decrease in the vapor pressure caused by the application of the negative pressure in the decompression chamber 52b. As a result, the internal pressure of the decompression chamber 52b enters an equilibrium state, such that the fuel vapor in the decompression chamber 52b enters a saturated state at the equilibrium pressure.

Figure 7:
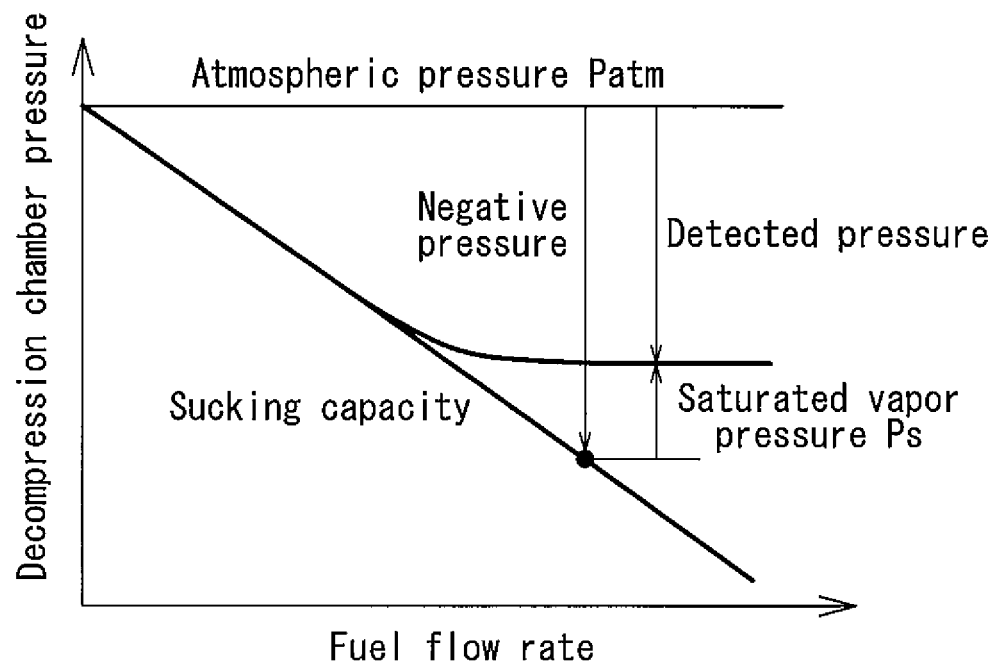
FIG. 7 is a graph showing pressure changes in a decompression chamber of an aspirator.
Figure 8:
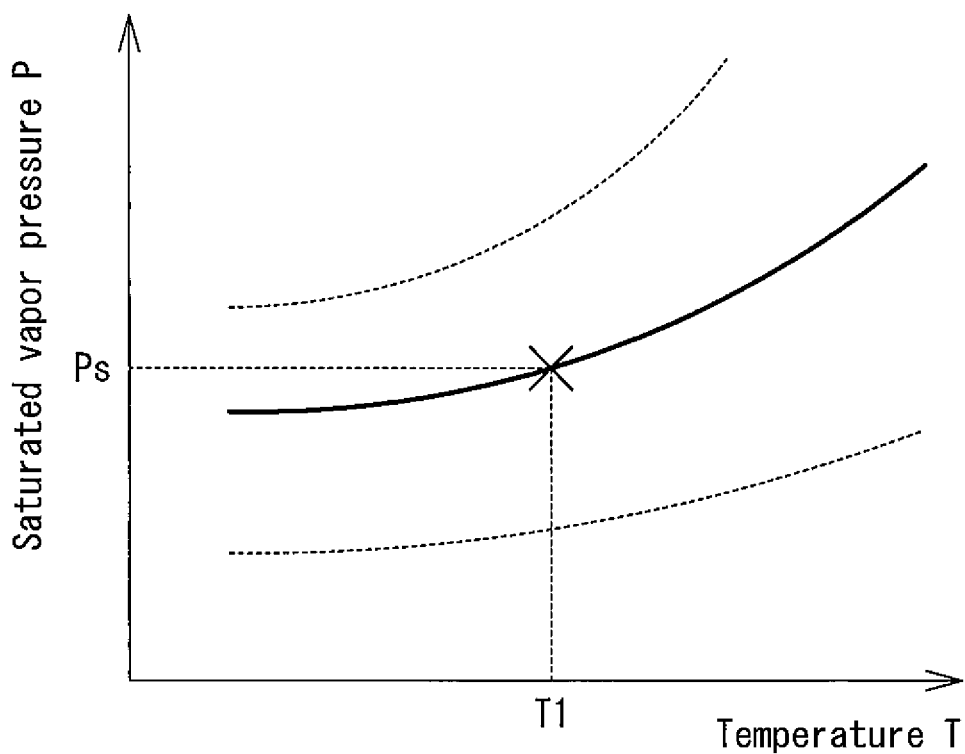
FIG. 8 is a graphs showing saturation vapor curves.

As shown in FIG. 7, the saturation vapor pressure Ps of the fuel vapor can be calculated from a difference between an expected negative pressure in the decompression chamber 52b, which is determined based on the flow rate of the liquid fuel flowing through the aspirator 50, and the actual pressure in the decompression chamber 52b, which may be measured by a differential pressure sensor 42e. The flow rate of the liquid fuel flowing through the aspirator 50 can be estimated from the rotational speed of the fuel pump 21 or the like. As shown in FIG. 8, the saturation vapor pressure curve can be specified by a specific relationship between the saturation vapor pressure Ps and the temperature T1. The temperature T1 corresponds to a temperature of the upper region of the gaseous layer in the fuel tank 20, which may be measured by the first temperature sensor 27. Once the appropriate saturation vapor pressure curve has been selected, changes in the saturation vapor pressure can be estimated from the temperature change in the gaseous layer of the fuel tank 20.

Next, fuel vapor density ρgv and air density ρatm in the gaseous mixture are estimated in order to calculate the partial pressure of the fuel vapor in the gaseous mixture within the gaseous layer of the fuel tank 20. The air density ρatm is a known fixed number. Thus, the fuel vapor density ρgv can be estimated by calculating the gaseous mixture density ρ and then subtracting the air density ρatm from the gaseous mixture density ρ. The gaseous mixture density ρ can be calculated based on following Formula (1).

$$\Delta P = (Q/CK)^2 \rho \qquad \text{Formula (1):}$$

In Formula (1), ΔP means a differential pressure between the gaseous mixture pressure before and after passing through the narrowed part 42d. The differential pressure ΔP is measured by the differential pressure sensor 42e. Q means a flow rate of the gaseous mixture. C means a flow coefficient corresponding to the flow rate Q. K means a section modulus corresponding to a radial sectional area of the narrowed part 42d.

Figure 9:
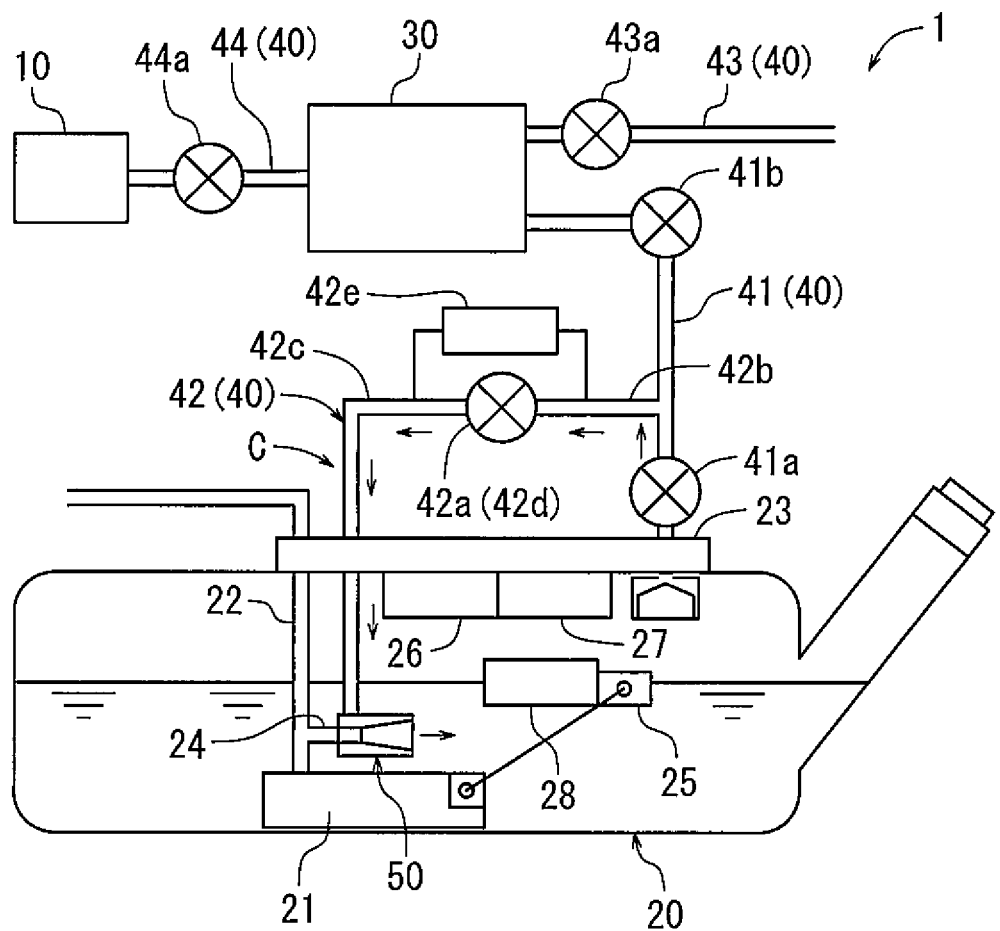
FIG. 9 is a schematic view of the fuel vapor processing system of FIG. 1 in a state where a fuel vapor concentration is estimated.

As shown in FIG. 9, in order to measure the differential pressure ΔP, the shut-off valve 41a is open, the closing valve 41b is closed, and the multistage shut-off valve 42a is partially closed to form the narrowed part 42d in the suction passage 42. In such state, the fuel pump 21 is driven to operate the aspirator 50. Due to the aspiration action of the aspirator 50, the gaseous mixture flows from the gaseous layer of the fuel tank 20 through the vapor passage 41, the upstream suction passage 42b, the narrowed part 42d, the downstream suction passage 42c, and the aspirator 50, in this order. The differential pressure ΔP can be measured by the differential pressure sensor 42e as the gaseous mixture passes through the narrowed part 42d.

The ECU 60 is configured to calculate the gaseous mixture density ρ based on the Formula (1). The flow rate Q of the gaseous mixture may be estimated from various parameters of the fuel pump 21, such as electric current, voltage, and/or rotational speed. Both the flow coefficient C, which corresponds to the flow rate Q, and the section modulus K, which corresponds to the radial sectional area of the narrowed part 42d, may be known values and may be stored in the memory unit 62 of the ECU 60 in advance.

The fuel vapor density ρgv can be calculated by subtracting the known air density ρatm from the calculated gaseous mixture density ρ. Then, the vapor partial pressure can be estimated based on a fact that the ratio of the fuel vapor density ρgv to the gaseous mixture density ρ corresponds to the ratio of the fuel vapor pressure (vapor partial pressure) to the total pressure in the gaseous layer. The total pressure of the gaseous layer may be measured by the pressure sensor 26. When the estimated vapor partial pressure is less than the saturation vapor pressure corresponding to the temperature at that time, it is determined that the fuel vapor is not saturated. In this state, it is assumed that the fuel vapor pressure will increase to the saturation vapor pressure with time. On the contrary, when the estimated vapor partial pressure is greater than the saturation vapor pressure corresponding to the temperature at that time, in other words, there is a supersaturated state, it is assumed that the fuel vapor pressure will decrease to the saturation vapor pressure over time. It is thought that the rate of change of the actual vapor pressure toward the saturation vapor pressure would be proportional to the difference between the actual vapor pressure and the saturation vapor pressure. In some embodiments, the temporal changes of the fuel vapor pressure may be estimated by converting the calculated fuel vapor density ρgv to the fuel vapor concentration in the gaseous layer and then comparing this fuel vapor concentration to the saturated concentration.

When the gaseous mixture flows in the gaseous layer by convection, the rate of change of the fuel vapor pressure from the non-saturation vapor pressure to the saturation vapor pressure would be in proportion to the flow rate of the gaseous mixture in the gaseous layer, in addition to the difference between the non-saturation vapor pressure and the saturation vapor pressure. Thus, the ECU 60 is configured to estimate the convective velocity of the gaseous mixture. For estimating the convective velocity in this embodiment, the fuel pump 21 is stopped and the shut-off valve 41a and the multistage shut-off valve 42a are closed. Then, a pair of physical quantity sensors disposed in the gaseous layer measure a physical quantity in the gaseous layer. Specifically, the first temperature sensor 27 detects the temperature at the upper region of the gaseous layer, and the second temperature sensor 28 detects the temperature at the lower region of the gaseous layer. The convective velocity of the gaseous mixture corresponds to the heat flux Q generated by the thermal gradient between the upper region and the lower region of the gaseous layer. The heat flux Q can be calculated based on the following Formula (2).

$$Q = hA(T1-T2) \quad \text{Formula (2):}$$

In the Formula (2), h means a heat transfer coefficient, A means an area of a virtual interface between the upper region and the lower region in the gaseous layer, T1 means the measured temperature of the upper region, and T2 means the measured temperature of the lower region. For this embodiment, the heat transfer coefficient h and the area A may both be considered to be fixed numbers, and thus may be stored in the ECU 60 in advance.

Figure 10:
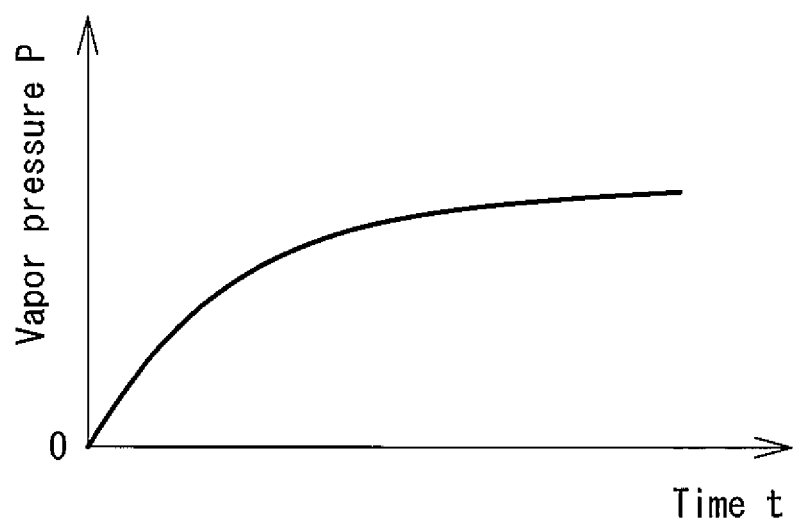
FIG. 10 is a graph showing a temporal change of the vapor pressure.
Figure 11:
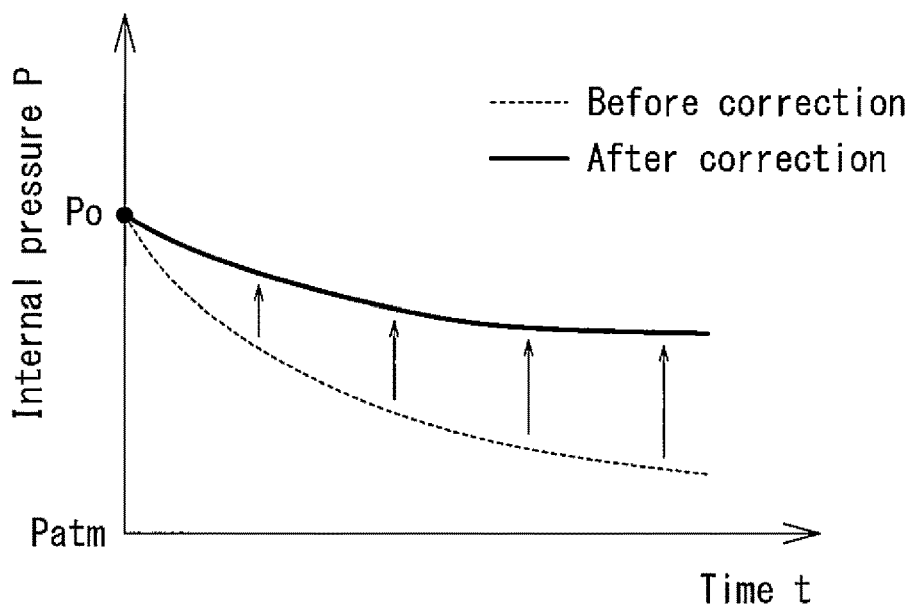
FIG. 11 is a graph showing a temporal change of an adjusted reference pressure.

After the saturated fuel vapor pressure curve, the vapor partial pressure, and the convective velocity of the gaseous mixture have been estimated, an embodiment by which was described above, the ECU 60 calculates the temporal change of the fuel vapor pressure from them. One example of the calculated temporal change of the fuel vapor pressure is shown in FIG. 10. In a case where the fuel vapor pressure increases with time, as shown in FIG. 10, the reference pressure can be corrected by adding the corresponding increment of the fuel vapor pressure to the reference pressure, as shown in FIG. 11.

Figure 12:
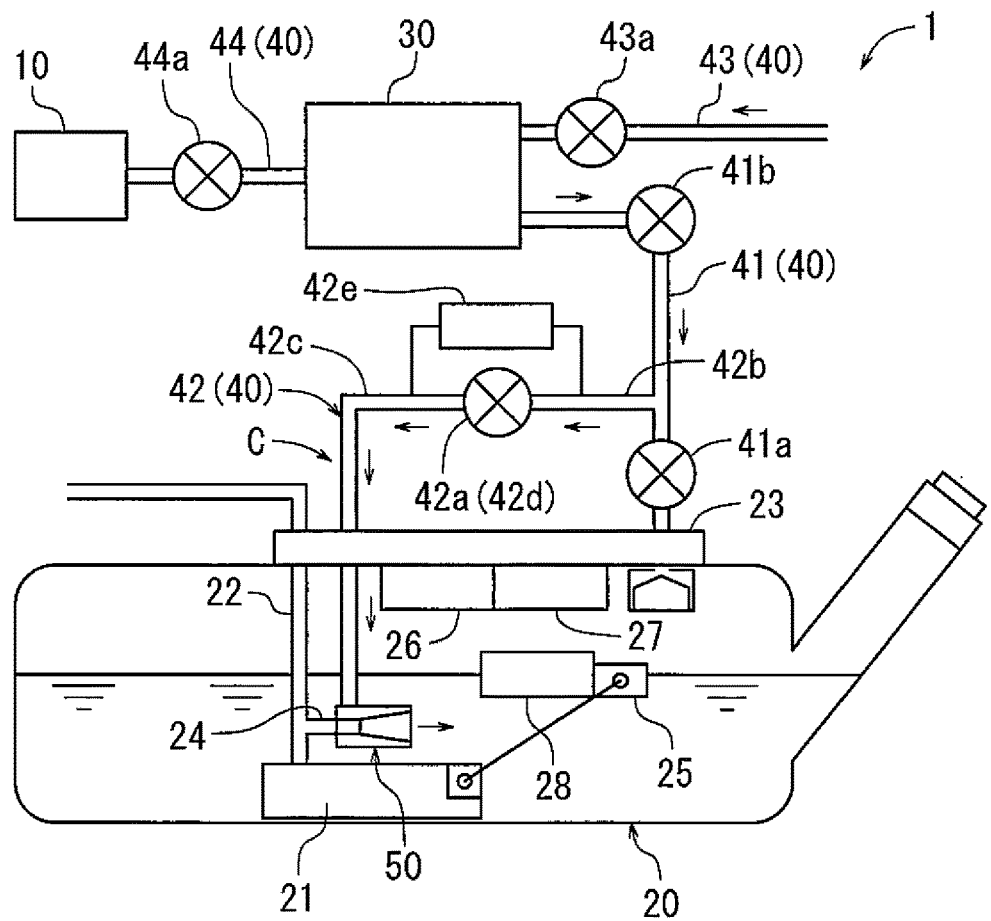
FIG. 12 is a schematic view of the fuel vapor processing system of FIG. 1, in which a positive pressure is introduced into the fuel tank.

After such correction of the reference pressure has been completed, a temporal change of the actual internal pressure of the fuel tank 20 is measured. As shown in FIG. 12, the closing valve 41b, the multistage shut-off valve 42a, and the atmospheric valve 43a are opened, and the shut-off valve 41a and the purge valve 44a are closed. The fuel pump 21 is driven under such state so as to forcedly feed the liquid fuel to the aspirator 50. Due to the sucking action of the aspirator 50, atmospheric air is introduced from the outside into the fuel tank 20, as shown by arrows in FIG. 12. When the internal pressure of the fuel tank 20, as detected by the pressure sensor 26, becomes the predetermined pressure P0, the fuel pump 21 is stopped, and the closing valve 41b and the multistage shut-off valve 42a are closed, such that the fluid communication between the fuel tank 20 and the outside is shut off. Then, the pressure sensor 26 detects the temporal change of the internal pressure of the fuel tank 20, after being shut off to the outside.

Figure 13:
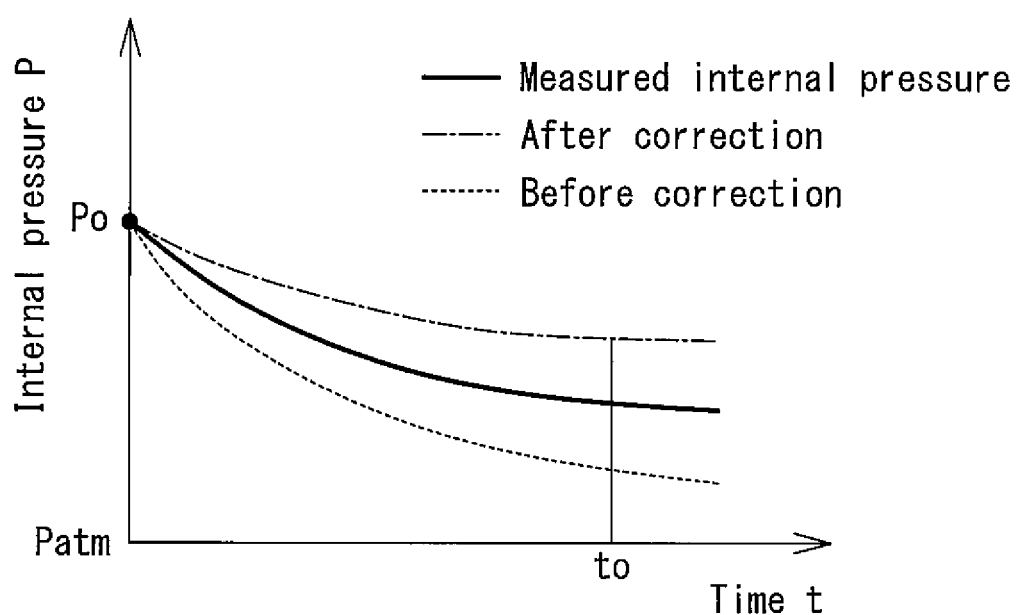
FIG. 13 is a graph showing a comparison between a detected inner pressure, the non-adjusted reference pressure, and the adjusted reference pressure.

FIG. 13 shows the measured internal pressure of the fuel tank 20, the non-corrected reference pressure, and the corrected reference pressure. In FIG. 13, the solid line is the measured internal pressure, the dotted line is the non-corrected reference pressure, and the dot-dashed line is the corrected reference pressure. At a predetermined time to, the measured internal pressure is higher than the non-corrected reference pressure. Thus, it would erroneously be determined that the fuel tank 20 seemingly has no leakage. However, since the reference pressure has been corrected in this embodiment based on the estimated changes of the fuel vapor pressure, the measured internal pressure is determined to be lower than the corrected reference pressure. Accordingly, the ECU 60 correctly determines that fuel vapor has leaked from the fuel tank 20. Due to this configuration, vapor leakage can be detected with higher accuracy by correcting the reference pressure based on the changes in the vapor pressure.

The leakage detector disclosed herein is not limited to the above described embodiments, and can be variously modified without departing from the gist of the disclosure. For example, in some embodiments, a leakage detector for a fuel vapor processing system, which is configured to prevent fuel vapor evaporated in a fuel tank from flowing to an outside, includes a first pressure sensor configured to measure an internal pressure of the fuel vapor processing system, and a control unit implemented by at least one programmed processor. The control unit is configured to calculate changes of a fuel vapor pressure from a saturation vapor pressure curve of the fuel vapor, a fuel vapor concentration of the fuel vapor in a gaseous layer within the fuel vapor processing system, and a convective velocity in the gaseous layer. The control unit is configured to correct a reference pressure for leakage detection based on the changes of the fuel vapor pressure so as to calculate a corrected reference pressure. The control unit is also configured to compare the internal pressure measured by the first pressure sensor to the corrected reference pressure so as to determine whether any of the fuel vapor has leaked from the fuel vapor processing system. In accordance with this construction, the reference pressure can be corrected more precisely due to estimating the changes of the fuel vapor pressure in a non-saturated state of the fuel vapor in the fuel tank. Accordingly, the accuracy of the leakage diagnosis can be improved.

In some embodiments, the leakage detector may further include an aspirator, a fuel pump, a temperature sensor, and a second pressure sensor. The aspirator is disposed in the fuel tank and includes a decompression chamber therein. The aspirator is configured to generate a negative pressure such that the negative pressure increases as a flow rate of liquid fuel flowing through an internal space of the aspirator increases. The fuel pump is configured to feed the liquid fuel to the aspirator. The temperature sensor is configured to measure a temperature of the fuel vapor in the gaseous layer while the liquid fuel flows through the internal space of the aspirator. The second pressure sensor is configured to measure a pressure in the decompression chamber of the aspirator while the liquid fuel flows through the internal space of the aspirator. The control unit is configured to calculate an anticipated negative pressure generated in the aspirator from the flow rate of the liquid fuel introduced into the aspirator. The control unit is configured to calculate a saturation vapor pressure of the fuel vapor from the pressure measured by the second pressure sensor and the anticipated negative pressure calculated by the control unit. The control unit is also configured to calculate the saturation vapor pressure curve from both the saturation vapor pressure of the fuel vapor and the temperature measured by the temperature sensor. In accordance with this construction, a precise saturation fuel vapor curve can be specified among various possible saturation fuel vapor curves, which typically vary depending on the precise composition of the fuel actually being used. Accordingly, the accuracy of the leakage detection can be improved.

In some embodiments, the control unit may be configured to calculate temporal changes of the fuel vapor pressure from the changes of the fuel vapor pressure calculated by the control unit, and to add the temporal changes of the fuel vapor pressure to the reference pressure or subtract the temporal changes of the fuel vapor pressure from the reference pressure so as to calculate the corrected reference pressure. In accordance with this construction, the saturation vapor pressure curve, the concentration, and the convective velocity can be reflected in the reference pressure by simple operations.

In some embodiments, the leakage detector may further include a pair of temperature sensors disposed in the fuel tank and spaced away from each other in a height direction of the fuel tank. The pair of the temperature sensors are configured to measure a temperature of a first and second portion, respectively, of a gaseous layer of the fuel tank. The control unit is configured to calculate a temperature gradient of the gaseous layer of the fuel tank from the temperatures measured by the pair of the temperature sensors and to calculate the convective velocity in the gaseous layer from the temperature gradient. In accordance with this construction, the convective velocity of the gaseous layer can be calculated by using a simple configuration, i.e. the pair of the temperature sensors.

In some embodiments, the leakage detector may further include a circulation passage and a differential pressure sensor. The circulation passage extends from the fuel tank and returns to the fuel tank. The circulation passage is configured to circulate a gas containing the fuel vapor and includes a narrowed part having a narrower passage area than an adjacent portion of the circulation passage. The differential pressure sensor is configured to measure a pressure difference of the gas within the circulation passage between before passing through the narrowed part and after passing through the narrowed part. The control unit is configured to calculate a fuel vapor density from the pressure difference of the gas measured by the differential pressure sensor and to calculate the fuel vapor concentration from the fuel vapor density. In accordance with this construction, the fuel vapor concentration can be calculated by using a simple configuration, thereby reducing heat generation.

In some embodiments, the leakage detector may be configured to detect leakage from the portions of the vapor passage that include both the fuel tank and the canister, rather than the fuel tank only. In such case, the atmospheric valve and the purge valve may be closed, and the shut-off valve and the closing valve remain open after introducing the positive pressure into the fuel tank. As such, temporal changes of the internal pressure may be measured in a state where the fuel tank and the canister are in fluid communication with each other and are shut off from the outside.

In some embodiments, the leakage may be detected by comparing temporal changes of the internal pressure to a corrected reference pressure after having introduced a negative pressure, instead of after introducing a positive pressure. In such case, the negative pressure generated by the engine may be applied to the fuel tank, so as to avoid complication of the leakage detector. In some embodiments, the saturation vapor pressure curve, the partial pressure, and the convective velocity may be estimated after introducing the positive pressure or the positive pressure may be introduced in the middle of estimation of the partial pressure or the convective velocity, so as to perform correction of the reference pressure, instead of introducing the positive pressure after correction of the reference pressure. In some embodiments, the control unit may be configured to calculate the amount of fluid discharged from the aspirator from certain parameters, such as rotational speed of the fuel pump, after estimating the partial pressure and applying the positive pressure, and to correct the partial pressure or the concentration of the fuel vapor based on the amount of fluid.

In some embodiments, the canister may be disposed in the fuel tank. In such case, the canister may be housed in a canister casing attached to and suspended from the lower surface of the set plate of the fuel tank.

In some embodiments, a pair of the temperature sensors are disposed to measure the temperature gradient in the fuel tank. For example, the pair of the temperature sensors may be spaced away from each other in the horizontal direction or both the horizontal direction and the vertical direction, instead of being spaced apart in the vertical direction only. The installation method or location of the pair of the temperature sensors is not limited. For example, the temperature sensors may be attached to an inward facing surface of the fuel tank or the canister casing. In some embodiments, at least three temperature sensor may be disposed in the fuel tank, instead of the pair of the temperature sensor, so as to increase the measurement accuracy of the temperature gradient in the gaseous layer.

In some embodiments, the circulation passage may be formed such that the fuel vapor circulates between the fuel tank and the canister. In such case, the suction passage may be positioned to extend from the canister to the aspirator, instead of branching from the vapor passage. Further, the closing valve may be disposed between the upstream suction passage and the canister.

In some embodiments, the narrowed part may have a fixed passage area defined by a venturi tube, an orifice plate, or the like, instead of the variable passage area defined by the multistage shut-off valve. In such case, an additional valve may be provided for closing the suction passage. In some embodiments, the narrowed part may be formed at the vapor passage of the circulation passage. In such case, the shut-off valve on the vapor passage may be replaced with a multistage shut-off valve.

In some embodiments, when the narrowed part has a fixed passaged area, the differential pressure sensor may be configured to measure a difference between the vapor pressure in the upstream suction passage and the vapor pressure in the narrowed part. The difference of the vapor pressure may be measured by a pair of pressure sensor, instead of the differential pressure sensor.

In some embodiments, the method for specifying the saturation vapor pressure curve may be performed by measuring pressure changes ΔP relative to temperature changes (from T1 to T2) in the gaseous layer, and looking for a saturated fuel vapor curve that corresponds to the pressure changes ΔP relative to the temperature changes (from T1 to T2) among a plurality of the saturated fuel vapor curves. In some embodiments, the temperature of the lower region of the gaseous layer, an average temperature between the temperatures of the upper region and the lower region, and/or the temperature in the decompression chamber of the aspirator may be used for specifying the saturation vapor pressure curve.

In some embodiments, an additional pump may be provided and used for feeding liquid fuel to the aspirator, instead of the fuel pump. In some embodiments, a differential pressure sensor provided at the circulation passage may be used as the second pressure sensor configured to measure the pressure in the decompression chamber of the aspirator. Alternatively, an additional pressure sensor may be provided at the downstream suction passage to function as the second pressure sensor.

In some embodiments, while the density ρ of the gaseous mixture is calculated based on Formula (1), a plurality of densities p may be calculated from a plurality of flow rates Q obtained by changing the rotational speed of the fuel pump. The influence of flow rate variations on a calculation result can thus be reduced by using an average of the calculated flow rates Q, thereby increasing the accuracy of the calculation of the density. In some embodiments, a plurality of densities ρ may be measured from a plurality of the section moduli K by changing the opening degree of the multistage shut-off valve without altering the flow rate.

In some embodiments, the partial pressure of the fuel vapor may be estimated from the ratio of the fuel vapor concentration in the gaseous mixture. The fuel vapor concentration may be calculated from the density of the fuel vapor or may be measured by a concentration sensor provided at the fuel vapor processing system.

In some embodiments, the convective velocity in the gaseous layer may be interpreted to correspond to a diffusion flux J generated by the density gradient of the fuel vapor between the upper region and the lower region in the gaseous layer. The convective velocity in the gaseous layer may be calculated based on such an interpretation by using Formula (3).

$$J = -D(C1 - C2) \quad \text{Formula (3):}$$

In Formula (3), C1 means the measured density of the fuel vapor in the upper region, C2 means the measured density of the fuel vapor in the lower region, and D means a diffusion coefficient. In such case, the densities C1, C2 may be measured by a pair of concentration sensors. That is, in this embodiment, the pair of the concentration sensors are provided as the pair of the physical quantity sensors, instead of the pair of the temperature sensors. The diffusion coefficient D in Formula (3) may be considered to be a fixed number, and thus may be stored in the ECU in advance. In a case where the convective velocity is calculated from the density gradient as described above, the total number of the temperature sensors provided in the fuel tank may be one.

What is claimed is:

1. A leakage detector for a fuel vapor processing system configured to prevent fuel vapor evaporated in a fuel tank from flowing to an outside, comprising:
    a first pressure sensor configured to measure an internal pressure of the fuel vapor processing system; and
    a control unit implemented by at least one programmed processor,
    wherein the control unit is configured to:
        calculate changes of a fuel vapor pressure from a saturation vapor pressure curve of the fuel vapor, a fuel vapor concentration of the fuel vapor in a gaseous layer within the fuel vapor processing system, and a convective velocity in the gaseous layer,
        correct a reference pressure for leakage detection based on the changes of the fuel vapor pressure so as to calculate a corrected reference pressure, and
        compare the internal pressure measured by the first pressure sensor to the corrected reference pressure so as to determine whether any of the fuel vapor has leaked from the fuel vapor processing system.

2. The leakage detector of claim 1, further comprising:
    an aspirator disposed in the fuel tank, wherein the aspirator includes a decompression chamber therein and is configured to generate a negative pressure such that the negative pressure increases as a flow rate of liquid fuel flowing through an internal space of the aspirator increases;
    a fuel pump configured to feed the liquid fuel to the aspirator;
    a temperature sensor configured to measure a temperature of the fuel vapor in the gaseous layer while the liquid fuel flows through the internal space of the aspirator; and
    a second pressure sensor configured to measure a pressure in the decompression chamber of the aspirator while the liquid fuel flows through the internal space of the aspirator,
    wherein the control unit is configured to:

calculate an anticipated negative pressure generated in the aspirator from the flow rate of the liquid fuel introduced into the aspirator, calculate a saturation vapor pressure of the fuel vapor from the pressure measured by the second pressure sensor and the anticipated negative pressure calculated by the control unit, and calculate the saturation vapor pressure curve from both the saturation vapor pressure of the fuel vapor and the temperature measured by the temperature sensor.

3. The leakage detector of claim 1, wherein the control unit is configured to:

calculate temporal changes of the fuel vapor pressure from the changes of the fuel vapor pressure calculated by the control unit, and add the temporal changes of the fuel vapor pressure to the reference pressure or subtract the temporal changes of the fuel vapor pressure from the reference pressure so as to calculate the corrected reference pressure.

4. The leakage detector of claim 1, further comprising:

a pair of temperature sensors disposed in the fuel tank and spaced away from each other in a height direction of the fuel tank, wherein the pair of the temperature sensors are configured to measure a temperature of a first and a second portion, respectively, of a gaseous layer of the fuel tank, wherein the control unit is configured to calculate a temperature gradient of the gaseous layer of the fuel tank from the temperatures measured by the pair of the temperature sensors and to calculate the convective velocity in the gaseous layer from the temperature gradient.

5. The leakage detector of claim 1, further comprising:

a circulation passage extending from the fuel tank and returning to the fuel tank, wherein the circulation passage is configured to circulate a gas containing the fuel vapor and includes a narrowed part having a narrower passage area than an adjacent portion of the circulation passage; and a differential pressure sensor configured to measure a pressure difference of the gas within the circulation passage between before passing through the narrowed part and after passing through the narrowed part, wherein the control unit is configured to calculate a fuel vapor density from the pressure difference of the gas measured by the differential pressure sensor and to calculate the fuel vapor concentration from the fuel vapor density.

* * * * *